Patented June 3, 1924.

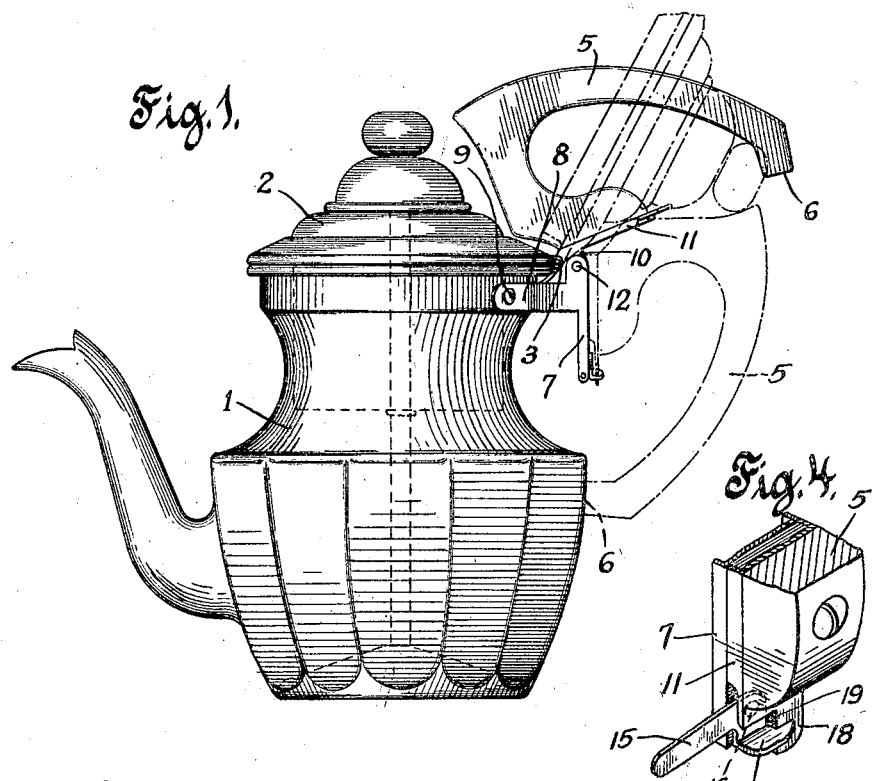

1,496,600

UNITED STATES PATENT OFFICE.

FREDERICK RAU, OF DENVER, COLORADO, ASSIGNOR OF FOUR-TENTHS TO L. SCHOENBRUNN AND JULIUS KELLER, COPARTNERS, AND ONE-FOURTH TO CARRIE KELLER, ALL OF NEW YORK, N. Y.

HANDLE CONSTRUCTION FOR POTS.

Application filed April 18, 1923. Serial No. 633,035.

*To all whom it may concern:*

Be it known that I, FREDERICK RAU, a citizen of the United States of America, residing at city of Denver, State of Colorado, have invented a new and useful Improved Handle Construction for Pots, of which the following is a specification.

My invention relates to an improved handle construction for tea and coffee pots and is especially adapted for use with percolators. Coffee percolators are ordinarily provided with wooden handles permanently secured to the back of the percolator at two points, that is near the top and near the bottom of the percolator. In use the lower end of the handle is subjected to severe heat, sometimes to the flame itself, and in time becomes charred and unsightly or is so weakened as to come off altogether.

An important object of my invention is to so mount the handle on the pot that it will perform all the usual functions of a handle and may also be moved outside the zone of destructive heat.

Another object is to provide a handle arranged to hold the percolator cover closed against the pressure of the vapors within the percolator.

Fig. 1 is a side elevation of a percolator showing in full lines the handle holding down the cover and removed from the heat, the normal position of the handle being indicated in broken lines.

Fig. 2 is a rear elevation of the percolator and handle as seen from the right of Fig. 1.

Fig. 3 is horizontal section of the percolator as seen from below, the handle being in its lower or normal position and Fig. 4 is a fragmentary perspective of the catch lever which holds the handle in normal position.

The invention is applicable to all forms of pots and percolators, but I have shown a conventional percolator 1 having a cover 2 hinged thereto as at 3. The handle 5 may be of any usual or desired shape but ordinarily terminates in a lower end 6 adapted normally to rest against and carry the thrust of the percolator when the latter is lifted by means of the handle, as shown in dotted lines in Fig. 1. In order that the handle may be lifted out of the hot zone when the percolator is on the fire, I connect it to the percolator by suitable hinge construction. In the present instance I provide a vertically disposed channel shaped support 7 having two oppositely extending arms 8 fastened to the percolator body in any convenient manner, for instance by the rivets or bolts 9. The upper end of the support 7 terminates in ears adapted to receive a pin 12 on which are journalled the ears 10 of a handle carrying member 11. The parts just described constitute a hinge connection between the percolator 1 and the handle 5 which is secured to member 11 as by the bolts and nuts 13. Preferably I relate the position of the handle hinge to the cover hinge so that the handle will when in normal position (dotted lines in Fig. 1) limit opening movement of the cover 2, and when the handle is raised to its upper position it will close the cover, but I do not consider this essential.

To move the handle from one extreme position to the other and hold it firmly in the latter position I provide a spring 14 coiled about pin 12 and having its opposite ends respectively in engagement with the support 7 and handle carrier 11. I also provide a suitable catch to hold the handle in the other position against the pressure of the spring. I prefer to arrange the spring so as to raise the handle to its upper position when the catch is released. With this arrangement the catch consists of a lever 15 pivoted to the support 7 as at 16 and having a hook portion 17 adapted to engage projection 18 on carrier 11.

Thus when the percolator is set on the stove, a slight upward movement of arm 15 releases the hook 17 from engagement with the carrier, and spring 14 snaps the handle into its upper position out of reach of the flame or destructive heat. If the cover 2 were open, this movement of the handle would close the cover, and the force of the spring is sufficient to hold it closed against the pressure of vapors within the percolator.

The lever 15 when released falls back until its movement is limited by the stop 19 in position to permit hook 17 to again engage the handle carrier when the handle is moved into its lower or normal position. I curve the edge or hook 17 so that projection 18 will displace it at the end of such downward movement, and after said projection has passed the hook, the weight of lever 15 will cause the catch to automatically engage the projection to hold the handle in its lower or normal position. Thus when the percolator is to be removed from the stove, the handle is grasped and moved back to its normal position in which it will be held until the catch is again manipulated.

Obviously various changes may be made in details of construction without departing from the spirit of the invention as defined by the claims. For example I may secure the support to the pot by additional arms at its lower end, where a more substantial construction is desired. The particular shape of the support will also vary in accordance with the shape of the pot to which the support is to be attached. By employing bolts instead of rivets at 9, my handle construction may be sold separate from percolators, and attached by the buyers.

I claim:

1. The combination with a pot and a cover, a handle hinged to the upper part of the pot and having a portion serving to abut against the lower part of the side of the pot in the pouring position and adapted to be swung over the cover of the pot to hold it in place when in the cooking position.

2. The combination with a pot and a cover hinged thereto, of a handle pivotally connected to the pot and adapted to move the cover from open to closed position, a spring to operate the handle, and a catch to hold the handle against cover closing movement.

3. The combination with a pot having a supporting element of a handle carrying member hinged near its top to said element, a spring to swing the lower portion of the carrier away from said element and a catch to hold the carrier adjacent said element.

4. The combination with a pot of a handle carrier hinged thereto, a handle on the carrier, a spring to lift one end of the handle and carrier, and a lever pivoted to releasably secure the handle in its down position.

5. The combination with a pot of a handle member hingedly connected thereto and arranged to swing from a lower position adjacent the pot to an upper position in which it extends from the pot, means urging the handle into one of said positions, and means arranged to automatically engage with and hold the handle member when in its other position.

6. The combination with a pot of a handle member hingedly connected thereto and arranged to swing from a lower position adjacent the pot to an upper position in which it extends from the pot, means urging the handle into one of said positions, and a gravity operated catch arranged to automatically engage with and hold the handle member when in its other position.

7. The combination with a pot of a vertically extending channel shaped sheet metal support having two oppositely disposed arms secured to the pot, a spring hinge carried at the upper end of said support, a handle secured to the hinge, a lever pivoted to the support below the hinge connection and having a catch portion arranged to engage and hold the hinge near its lower end, said lever being operated by gravity to move said catch into the path of movement of said hinge, and a stop to limit such movement of said catch lever.

8. The combination with a pot, a handle permanently hinged to the upper part thereof and a manually operable catch for a lower portion of said handle whereby the handle may be held in a pouring position when said catch is engaged and said handle may be swung around the upper hinge portion when said catch is disengaged.

9. As an article of manufacture, a handle attachment for a pot comprising a support adapted to be secured to the upper end of a pot, a handle hinged to the upper part of said support, and a catch for securing a lower portion of said handle detachably to the lower part of said support.

10. As an article of manufacture, a handle attachment for a pot comprising a support adapted to be secured to the upper end of a pot, a handle hinged to an upper part of said support and adapted to depend in a pouring position, a spring normally tending to swing said handle into a nonpouring position, and a manually operable catch for holding said handle against the action of said spring.

FREDERICK RAU.